(12) United States Patent
Goodman et al.

(10) Patent No.: US 7,079,978 B2
(45) Date of Patent: Jul. 18, 2006

(54) APPARATUS, SYSTEM, AND METHOD FOR ABBREVIATED LIBRARY CALIBRATION

(75) Inventors: Brian Gerard Goodman, Tucson, AZ (US); Thomas Holderness Daily, Pinetop, AZ (US); James Arthur Fisher, Tucson, AZ (US); Dennis Paul Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/852,283

(22) Filed: May 24, 2004

(65) Prior Publication Data
US 2005/0261850 A1    Nov. 24, 2005

(51) Int. Cl.
*G06F 17/00* (2006.01)

(52) U.S. Cl. .................. 702/182; 702/85; 702/105; 700/214

(58) Field of Classification Search ............. 702/182, 702/85, 103, 104, 33, 113, 94, 150, 152, 186, 702/188; 700/213–215, 218, 245, 254, 255, 700/275; 369/30.01, 34.01, 30.31, 178.01; 711/100, 167; 901/46, 50
See application file for complete search history.

(56) References Cited

U.S. PATENT DOCUMENTS

| | | | |
|---|---|---|---|
| 4,908,777 A | 3/1990 | Wolfe ................ 364/513 |
| 5,426,581 A | 6/1995 | Kishi et al. ............ 364/167.01 |
| 6,115,648 A | 9/2000 | Gallo ..................... 700/218 |
| 6,356,803 B1 | 3/2002 | Goodman et al. .......... 700/218 |
| 6,473,706 B1 * | 10/2002 | Gallo et al. ................ 702/105 |
| 6,574,529 B1 * | 6/2003 | Lundeen et al. ............ 700/218 |
| 6,658,320 B1 | 12/2003 | Goodman et al. .......... 700/214 |
| 6,675,063 B1 * | 1/2004 | Bosley et al. ............... 700/218 |
| 6,895,300 B1 * | 5/2005 | Goodman et al. .......... 700/213 |
| 2002/0177924 A1 | 11/2002 | Manes et al. ................ 700/218 |
| 2003/0139846 A1 | 7/2003 | Goodman et al. .......... 700/218 |
| 2003/0187544 A1 | 10/2003 | Bosley et al. ............... 700/218 |

* cited by examiner

*Primary Examiner*—Hal Wachsman
(74) *Attorney, Agent, or Firm*—Kunzler & Associates

(57) ABSTRACT

An apparatus, system, and method are disclosed for performing an abbreviated calibration of an automated data storage library. An abbreviated calibration apparatus includes a calibration module, a tracking module, and a system availability module. The calibration module calibrates one or more accessors within the library. Calibration refers to the physical relationship between an accessor and a data storage location, such as a shelf, drive, or I/O station. The calibration module may comprise a run-time calibration module, a successive calibration module, or a cooperative calibration module. The tracking module tracks the calibration progress of the accessors. The system availability module notifies a host when the library is available. The library is made available prior to calibration completion of all of the accessors and, in some embodiments, prior to calibration completion of any of the accessors.

30 Claims, 11 Drawing Sheets

APPARATUS, SYSTEM, AND METHOD FOR ABBREVIATED LIBRARY CALIBRATION

BACKGROUND OF THE INVENTION

1. Field of the Invention

This invention relates to automated data storage libraries and more particularly relates to an automated data storage library configured to perform an abbreviated calibration of one or more accessors. The abbreviated calibration allows the library to be made available to hosts more quickly than conventional calibration techniques.

2. Description of the Related Art

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™ cards, SMARTMEDIA™ cards, MEMORY STICK™ cards, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors or pickers (hereinafter termed "accessors"). Such accessors have grippers for physically retrieving the selected data storage media from the storage shelves within the automated data storage library and transport such media to the data storage drives by moving in the X and/or Y directions. Depending on the library design, more complicated movement may include a Z direction and even radial movements of the gripper.

In order to accommodate certain mechanical tolerances within the hardware of an automated data storage library, the automated data storage library performs a calibration to account for differences between where hardware is expected to be and where it is actually located. Performing such a calibration allows greater tolerances in the design and manufacture of the library components, which results in a more affordable end product. Calibration techniques also may be applied in error recovery procedures to compensate for hardware or software problems that may develop over time.

However, calibrating an accessor within an automated data storage library may necessitate that the library be and remain off line for a significant duration of time. Depending on the size and contents of an automated data storage library, the calibration process may take several minutes or more for each storage frame within the library. It is apparent that calibrating an accessor to every shelf, slot, drive, and so forth, can dramatically affect the availability and performance of an automated data storage library. Additionally, some automated data storage libraries incorporate multiple accessors. For every accessor that must be calibrated to the entire library, conventional calibration techniques require 100% more time than for calibration of a single accessor. For example, calibrating two accessors may take twice as much time as calibrating a single accessor.

Some calibration techniques have been implemented to decrease the amount of time needed to calibrate an automated data storage library. Some libraries, for instance, calibrate multiple columns of storage shelves by calibrating only the outside columns and using interpolation to predict the location of intermediate columns and shelves. Regardless of these conventional techniques, however, the time required to calibrate one or more accessors to an entire automated data storage library is substantial and should be further reduced.

From the foregoing discussion, it should be apparent that a need exists for an apparatus, system, and method that performs an abbreviated calibration of a data storage library. Beneficially, such an apparatus, system, and method would calibrate one or more accessors within an automated data storage library in less time than conventional library calibration methods and systems.

SUMMARY OF THE INVENTION

The present invention has been developed in response to the present state of the art, and in particular, in response to the problems and needs in the art that have not yet been fully solved by currently available library calibration systems. Accordingly, the present invention has been developed to provide an apparatus, system, and method for performing an abbreviated calibration of a data storage library that overcomes many or all of the above-discussed shortcomings in the art.

The apparatus to perform an abbreviated calibration of an automated data storage library is provided with a logic unit containing a plurality of modules configured to functionally execute the necessary steps of performing an abbreviated calibration of a data storage library. These modules in the described embodiments include a run-time calibration module, a successive calibration module, and a cooperative calibration module. In one embodiment, the run-time calibration module may include an idle calibration module and an on-demand calibration module. The apparatus also may include a calibration tracking module, a system availability module, a collision avoidance module, and a media exchange module.

The apparatus, in one embodiment, is configured to implement an abbreviated calibration via the run-time calibration module, which calibrates an accessor either before or after the automated data storage library is made available to a host. The run-time calibration module may employ either the idle calibration module or the on-demand calibration module. The idle calibration module calibrates an accessor while the automated data storage library is available to the hosts, but during times when the accessor is not processing data access requests. The on-demand calibration module calibrates an accessor while the automated data storage library is available and in response to a data access request for which the accessor was not previously calibrated.

Alternately, the apparatus performs an abbreviated calibration via the successive calibration module, which calibrates two or more accessors in succession—one after the other—with only a slight delay between accessors. In a further embodiment, the apparatus employs the cooperative calibration module to calibrate certain calibration zones within the automated data storage library. The calibration zones may be wholly exclusive or partially overlapping. Together the calibration zones cover the entire library.

The apparatus is further configured, in one embodiment, to track the calibration progress and completion of the individual accessors using the calibration tracking module. The system availability module may be invoked to notify a host, or another component or module within the automated data storage library, that the library may be made available to the host. The collision avoidance module mitigates potential collisions that might occur between accessors during the calibration of the automated data storage library. The media exchange module facilitates a cartridge hand-off in the case of partial calibration in which two or more accessors are required to execute a data access operation.

A system of the present invention is also presented to perform an abbreviated calibration of an automated data storage library having only a single accessor. Another system of the present invention is presented to perform an abbreviated calibration of an automated data storage library having a plurality of accessors. These systems may be embodied in a linear or a circular data storage library or any shape and configuration of library.

A method of the present invention is also presented for performing an abbreviated calibration of a data storage library. The method in the disclosed embodiments substantially includes the steps necessary to carry out the functions presented above with respect to the operation of the described apparatus and system. In one embodiment, the method includes calibrating one or more accessors, tracking the calibration progress of the accessors, and notifying a host or another component or module within the automated data storage library, that the automated data storage library is available even though not all of the accessors are calibrated to the entire library.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
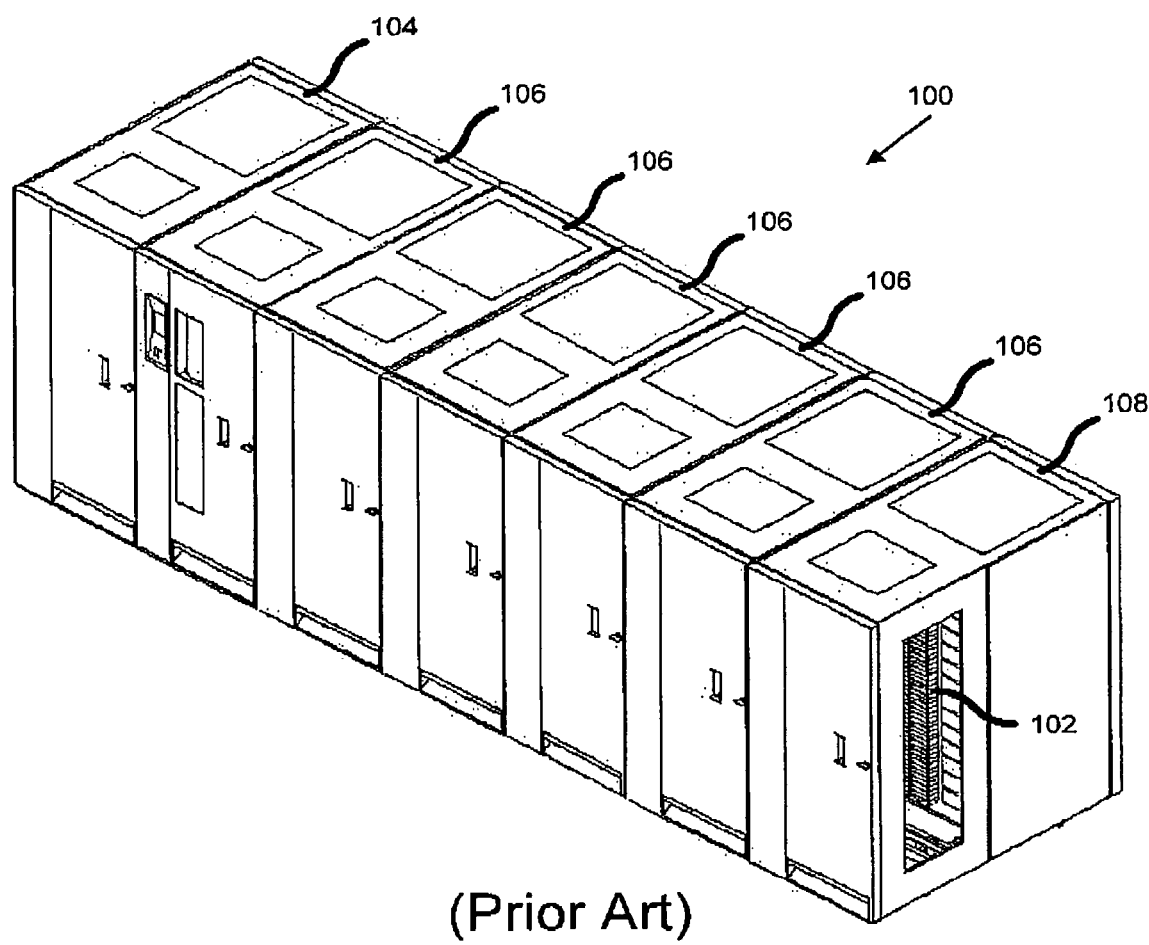
FIG. 1 is an isometric view of an automated data storage library of the prior art adaptable to implement an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executable of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices and processors. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Turning now to the figures, FIG. 1 illustrates an automated data storage library 100 which stores and retrieves data storage cartridges containing data storage media (refer to FIG. 5) in storage shelves 102. It is noted that references to "data storage media" herein also refer to data storage cartridges and, for purposes herein, the two terms are used synonymously. An example of an automated data storage library 100 which may implement the present invention, and has a configuration as depicted in FIG. 1, is the IBM 3584 UltraScalable Tape Library.

The library 100 of FIG. 1 comprises a left hand service bay 104, one or more storage frames 106, and a right hand service bay 108. A service bay 104, 108 is characterized by its designation as the location in which an accessor may "park" when not in use. Having a service bay 104, 108 at each end of the library 100 allows multiple accessors to each have full access to all of the storage shelves 102 and drives within the intermediate storage frames 106. For example, one accessor may park out of the way in the left service bay 104 while a second accessor accesses a drive in the storage frame 106 adjacent to the left service bay 104. All of the service bays 104, 108 and storage frames 106 may be referred to as frames 104–108. As will be discussed, a frame 104–108 may comprise an expansion component of the library 100. Frames 104–108 may be added or removed to expand or reduce the size and/or functionality of the library 100. Frames 104–108 may comprise additional storage shelves 102, drives, import/export stations, accessors, operator panels, etc., as will be discussed below.

Figure 2:
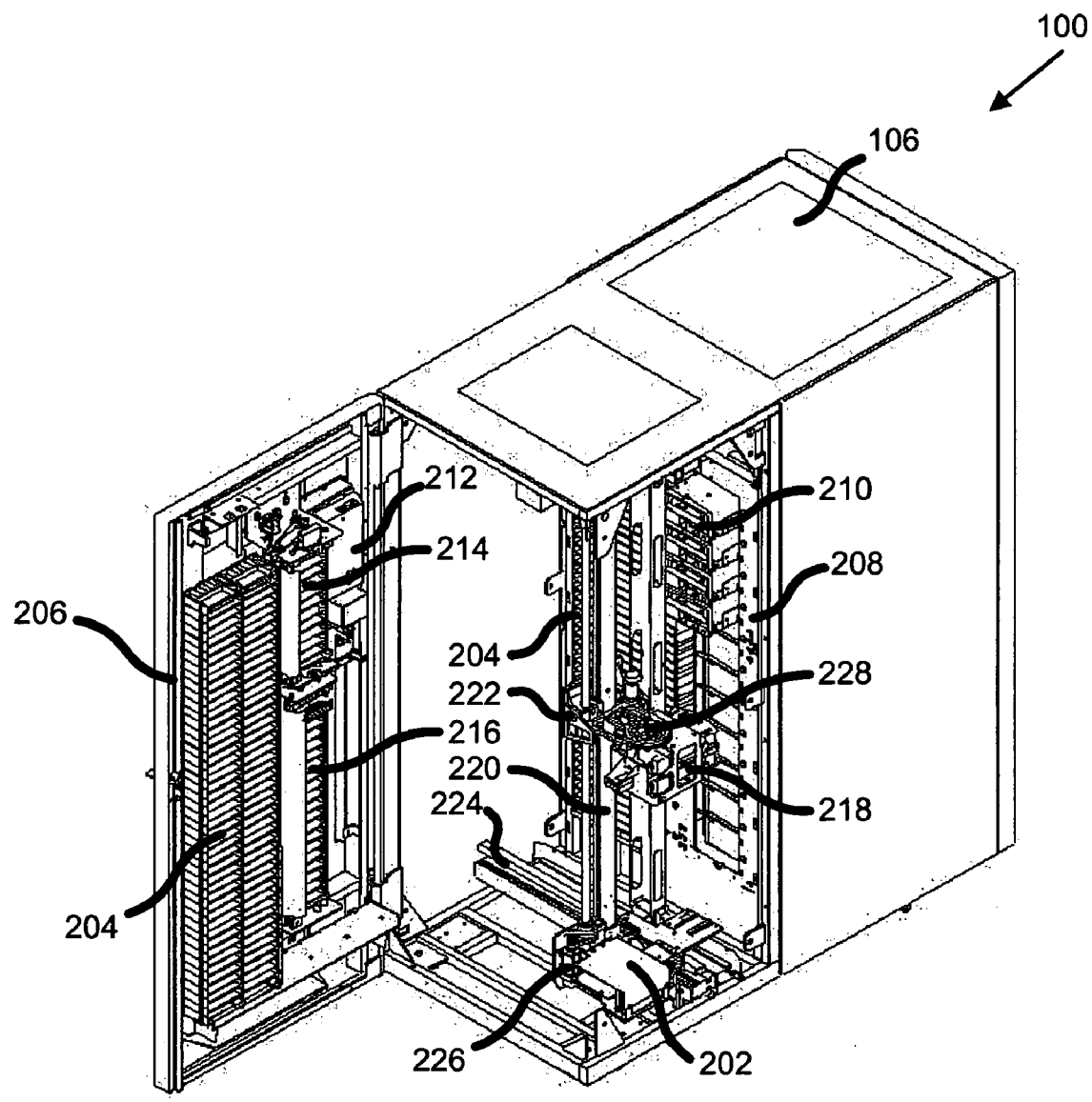
FIG. 2 is an isometric view of a storage frame, including an exemplary basic configuration of some internal components, of an automated data storage library.

FIG. 2 shows an example of a single storage frame 106, which is contemplated to be the minimum configuration of an automated data storage library 100. In this minimum configuration, there is only a single accessor 202 (i.e., there are no redundant accessors) and there are no service bays 104, 108. The library 100 is arranged for accessing data storage media in response to commands from at least one external host system (not shown). In one embodiment, the library 100 comprises a plurality of storage shelves 204; one front wall 206 and one rear wall 208 for storing data storage cartridges that contain data storage media (refer to FIG. 5); at least one data storage drive 210 for reading and/or writing data with respect to the data storage media; and the illustrated accessor 202 for transporting the data storage media between the plurality of storage shelves 204 and the data storage drive(s) 210. Both the storage shelves 204 and the storage drives 210, as well as other locations suitable for holding data storage media, may be referred to as "data storage locations." The data storage drives 210 may be optical disk drives, magnetic tape drives, or other types of data storage drives as are used to read and/or write data with respect to the data storage media.

The storage frame 106 may optionally comprise an operator panel 212 or other user interface, such as a web-based interface, which allows a user to interact with the library 100. The storage frame 106 may optionally comprise an upper I/O station 214 and/or a lower I/O station 216, which allows data storage media to be inserted into the library and/or removed from the library without disrupting library operation. For example, a user may insert a storage media cartridge into one of the I/O stations 214, 216 while the front wall 206 of the storage frame 106 is closed. The I/O stations 214, 216 also may be referred to as "data storage locations." Further embodiments of the library 100 also may comprise one or more service bays 104, 108 and/or additional storage frames 106, each having storage shelves 204 accessible by an accessor 202.

As described above, each of the storage frames 106 may be configured with different components depending upon the intended function. One configuration of storage frame 106 may comprise storage shelves 204, data storage drive(s) 210, and other optional components to store and retrieve data from the data storage cartridges. In a further embodiment, the storage frame 106 may be converted to a service bay 104, 108 within a larger automated data storage library 100. Conversely, a service bay 104, 108 may be converted into a storage frame 106, such as when additional frames 104–108 are added onto an existing library 100. The new frames 106 may be bolted onto the end of the existing service bay 104, 108. The existing service bay 104, 108 then may be converted into a storage frame 106 and filled with storage shelves 204, drives 210, and the like. Alternatively, a service bay 104, 108 may already contain storage shelves 204 and there may be no conversion required (refer to the storage shelves 102 in FIG. 1).

In one embodiment, the accessor 202 comprises a gripper assembly 218 for gripping one or more data storage media and transporting the data storage media among the storage shelves 204 and drives 210. The gripper assembly 218 is mounted to a vertical rail 220 (also referred to as a "Y" rail)

and may be transported vertically on the vertical rail 220 via a Y rail drive 222. The vertical rail 220 and gripper assembly 218, in turn, may be transported horizontally along a horizontal rail 224 (also referred to as an "X" rail) by an X rail drive 226. If multiple accessors 202 are installed in a single library 100, they may each run on an independent X rail(s) 224 or may run on the same X rail(s) 224. In a further embodiment, the gripper assembly 218 may rotate approximately 180 degrees via a rotational drive 228. In this way, the gripper assembly 218 may access the storage shelves 204 and I/O stations 214, 216 on the front wall 206, as well as the storage shelves 204 and drives 210 on the rear wall 208.

Figure 3:
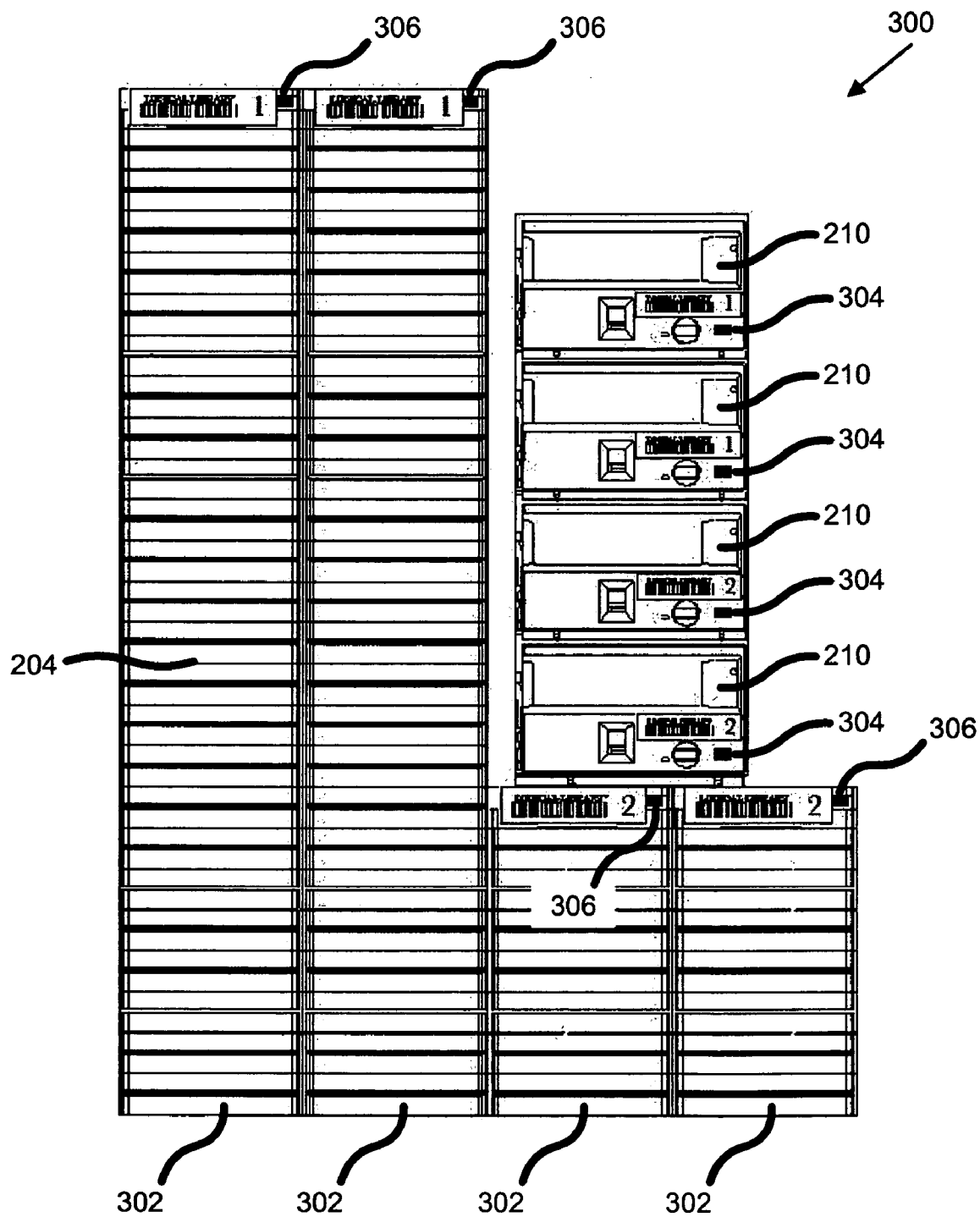
FIG. 3 is a front view of one embodiment of a wall of an automated data storage library, specifically depicting storage slots, storage drives, and calibration reference points.

FIG. 3 illustrates one embodiment of a storage device configuration 300 within a storage frame 106. Specifically, the illustrated storage device configuration 300 is representative of the top part of a rear wall 208 of a storage frame 106, which is similar to the rear wall 208 of the automated data storage library 100 of FIG. 2. The storage device configuration 300 comprises storage shelves 204 and data storage drives 210. In one embodiment, the storage shelves 204 are arranged in columns 302. Each column 302 of storage shelves 204 (four columns 302 are shown) and each data storage drive 210 has one or more calibration reference points 304, 306. For example, each of the drives 210 has a drive reference point 304. Likewise, each of the columns 302 of storage shelves 204 has an upper reference point 306. Each of the columns 302 of shelves 204 also may have a corresponding lower reference point (not shown) at the bottom of each column 302. The described calibration reference points 304, 306 are intended to be detected by a calibration sensor on the accessor 202. In one embodiment, a calibration sensor is located on the gripper assembly 218, as will be discussed in greater detail with reference to FIG. 6. Various additional embodiments of these calibration reference points 304, 306 are depicted in FIGS. 6a–6d.

The drive reference points 304 are used to physically calibrate the accessor 202 and gripper assembly 218 so that data storage cartridges may be inserted into and removed from the drives 210. For each data storage drive 210 installed in the library 100, an offset is known from the drive reference point 304 to the media receptacle on the drive 210 where a data storage cartridge may be inserted.

Similarly, the upper and lower reference points 306 on the columns 302 of shelves 204 are used to physically calibrate the accessor 202 and gripper assembly 218 so that data storage cartridges may be inserted into and removed from the shelves 204. By detecting the upper and lower reference points 306 for a single column 302, a shift or tilt in the column 302 may be detected. For each column 302 of storage shelves 204, several vertical and horizontal offsets may be calculated where one pair of vertical and horizontal offsets may indicate the calculated position of a particular storage shelf 204 within the column 302.

Where multiple columns 302 are mounted to the front wall 206 or rear wall 208, the offsets for all of the storage shelves 204 in the multiple columns 302 may be interpolated from calculations based on detecting the upper and lower reference points 306 for the two outermost columns 302. For example, if the front wall 206 of a storage frame 106 had no I/O stations 214, 216 and instead had five columns 302 of storage shelves 204, the positions for each of the shelves 204 in columns one and five may be calculated by detecting the upper and lower reference points 306 for columns one and five. Additionally, the positions for each of the shelves 204 in columns two, three, and four (between columns one and five) may be calculated from the same detected reference points 306 for columns one and five.

Any location in the library 100 that is capable of holding data storage media may have similar reference points. For example, but without limitation, I/O stations 214, 216, data storage drives 210, storage shelves or slots 204, etc, may each have one or more calibration reference points.

Figure 4:
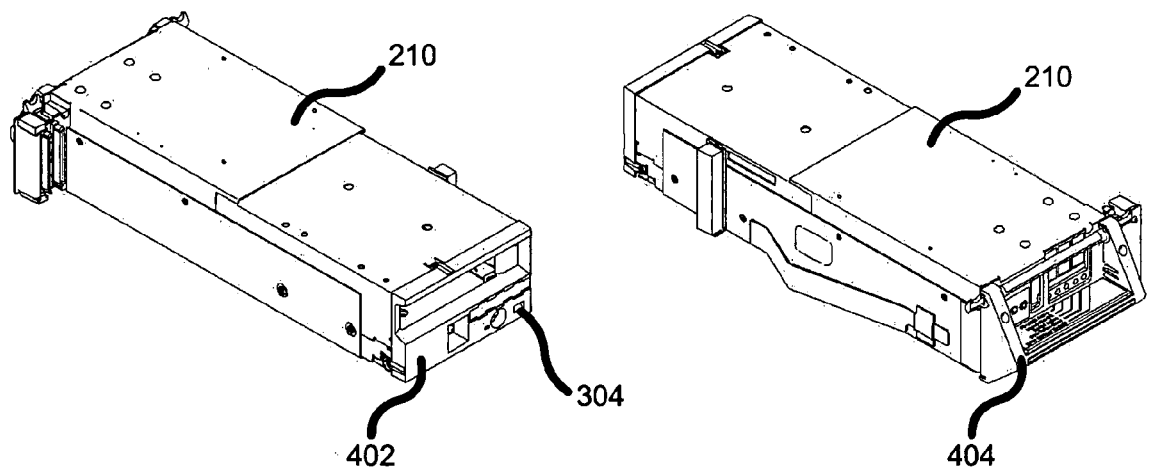
FIG. 4 is an isometric view of the front and rear of a data storage drive that may be used in an automated data storage library to store and/or retrieve data.

FIG. 4 illustrates one embodiment of a data storage drive 210 that may be installed in the automated data storage library 100 of FIG. 1. Specifically, FIG. 4 depicts the front 402 and rear 404 of a data storage drive 210. A drive reference point 304, as described with reference to FIG. 3, is shown on the drive bezel of the storage drive 210. In the example shown in FIG. 4, the data storage drive 210 comprises a hot-swap drive canister. This is only an example and is not meant to limit the invention to hot-swap drive canisters. In fact, any configuration of data storage drive 210 may be used whether or not it comprises a hot-swap canister.

Figure 5:
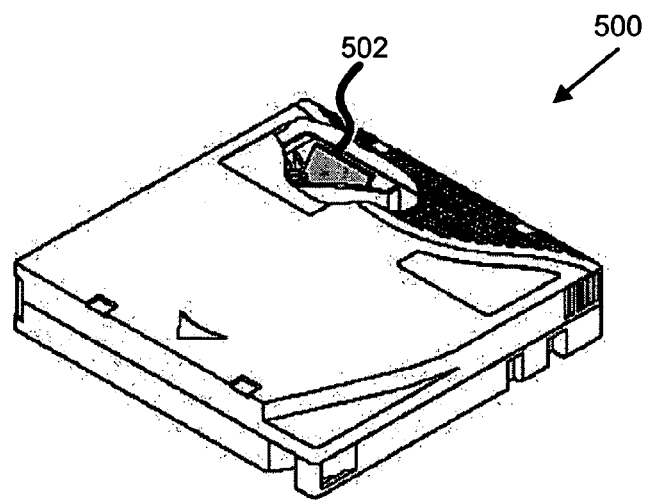
FIG. 5 is an isometric view of an exemplary data storage cartridge.

FIG. 5 illustrates one embodiment of a data storage cartridge 500 that may be used in conjunction with the data storage drive 210 shown in FIG. 4. The illustrated data storage cartridge 500 includes a cartridge memory 502 (shown in a cutaway portion of the figure). This is only an example and is not meant to limit the invention to cartridge memories 502. In fact, any configuration of data storage cartridge 500 may be used whether or not it comprises a cartridge memory 502. Additionally, as mentioned above, references to "data storage media" herein also refer to data storage cartridges 500 and, for purposes herein, the two terms are used synonymously, usually referring to the physical cartridge 500 handled by the gripper assembly 218.

Figure 6:
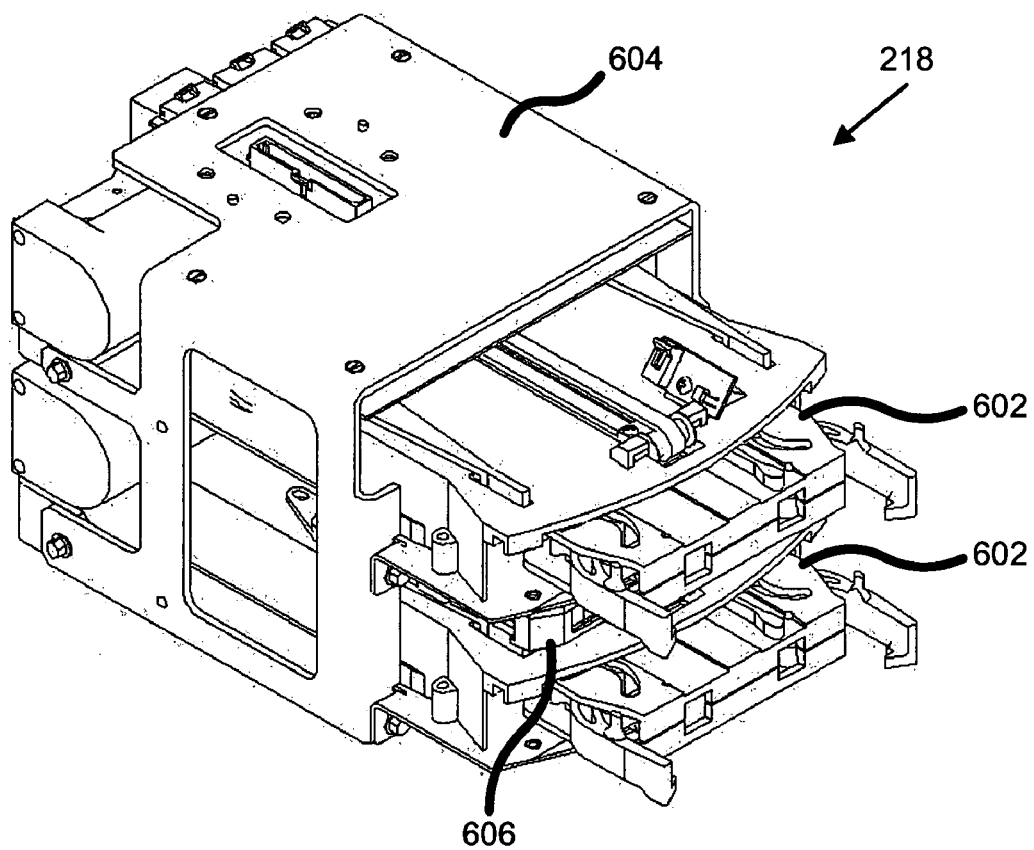
FIG. 6 is an isometric view of an exemplary cartridge gripper assembly adaptable to implement an embodiment of the present invention.
Figure 6A:
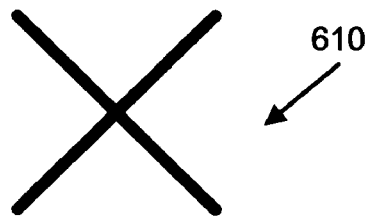
FIGS. 6a–6d illustrate various exemplary calibration reference points in accordance with the present invention.
Figure 6B:
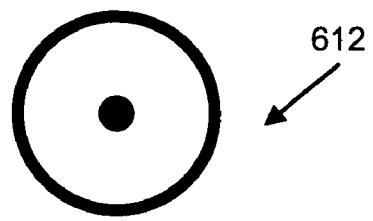
Figure 6C:
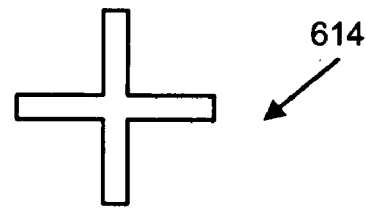
Figure 6D:
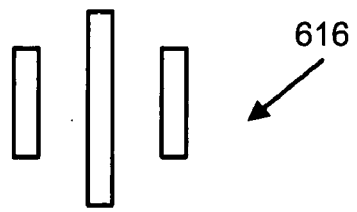

FIG. 6 depicts one embodiment of the gripper assembly 218 shown in FIG. 2. In addition to the features already described above, the illustrated gripper assembly 218 includes two cartridge grippers 602 within a housing 604. Each of the cartridge grippers 602 comprises two clamping arms that are configured to grip and retain a data storage cartridge 500 in order to move the data storage cartridge 500 within an automated data storage library 100. Once a data storage cartridge 500 is moved from a source location, such as a storage shelf 204, to a target location, such as a data storage drive 210, the clamping arms may disengage from and release the data storage cartridge 500.

In one embodiment, the gripper assembly 218 includes a calibration sensor 606 that may be used to sense or detect the calibration reference points 304, 306 of the data storage drives 210 and the columns 302 of storage shelves 204. In certain embodiments, the calibration sensor 606 transmits a small beam of light, for example, toward a calibration reference point 304, 306. A detector at the calibration sensor 606 may detect if the transmitted light is reflected back toward the calibration sensor 606. In further embodiments, the calibration sensor 606 may comprise other optical sensors such as, but without limitation, cameras, line scanners, line cameras, bar code scanners, infrared detectors, charge coupled devices (CCD), etc. Alternatively, the calibration sensor 606 may comprise other sensors such as, but without limitation, proximity sensors, magnetic sensors, radio frequency identification (RFID) tag readers, smart card readers, cartridge memory readers, pressure sensors, touch sensors, servo feedback sensing, and so forth.

By moving the gripper assembly 218 while transmitting light at a calibration reference point 304, 306, the detector at the calibration sensor 606 detects if the transmitted light is reflected or not. In one embodiment, the transmitted light may reflect off of a surface surrounding the calibration reference point 304, 306, but is not reflected when "within" the calibration reference point 304, 306. In this way, the calibration sensor 606 may detect one or more edges of a calibration reference point 304, 306 and extrapolate the other edges, the center, or another defining portion of the calibration reference point 304, 306.

Referring back to FIGS. 3 and 4, the depicted calibration reference points 304, 306 are rectangular. FIGS. 6a–6d illustrate several alternative examples of calibration reference points 610–616. In particular FIGS. 6a–6d, respectively, depict: a first calibration reference point 610 in the shape of an "X"; a second calibration reference point 612 in the shape of concentric circles; a third calibration reference point 614 in the shape of perpendicular bars; and, a fourth calibration reference point 616 in the shape of parallel bars of unequal length. In certain embodiments, the calibration reference points 304, 306, 610–616 maybe printed or painted, may be various colors, may be holes, openings, protrusions, and so forth. Many other examples of calibration reference points 304, 306, 610–616 may be envisioned by one of skill in the art and applied within the scope of this invention. For example, if a magnetic sensor were used than a calibration reference point 304, 306, 610–616 having magnetic properties may be used.

Figure 7:
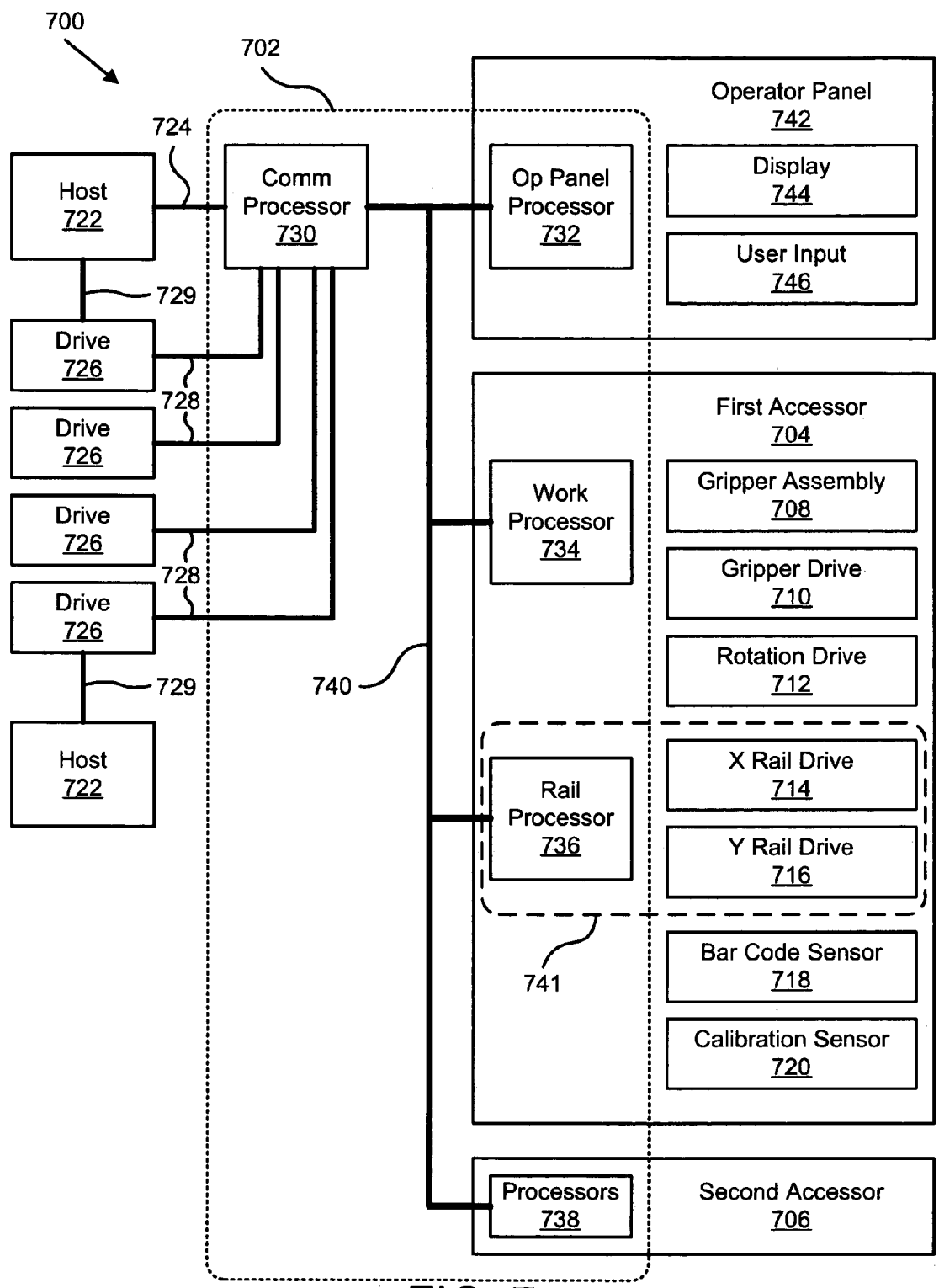
FIG. 7 is a schematic block diagram illustrating one embodiment of a distributed control system within an automated data storage library adaptable to implement an embodiment of the present invention.

FIG. 7 illustrates an embodiment of an automated data storage library 700 that is substantially similar to the automated data storage library 100 of FIG. 1. The illustrated library 700 employs a distributed control system 702 that includes a plurality of processor nodes. An example of an automated data storage library 700 which may implement the distributed control system 702 is the IBM 3584 UltraScalable Tape Library. For a more detailed background of certain embodiments of a distributed control system 702 incorporated in an automated data storage library 700, refer to U.S. Pat. No. 6,356,803 entitled "Automated Data Storage Library Distributed Control System," which is incorporated herein by reference.

While the automated data storage library 700 is described as employing a distributed control system 702, the present invention may be implemented in various automated data storage libraries 700 regardless of control configuration, such as, but not limited to, an automated data storage library 700 having one or more library controllers that are not distributed. In further embodiments of the invention, the distributed control system 702 may be distributed among various components of a library 700. For example, components may be located within the service bays 104, 108 or the storage frames 106. Still further, individual components may be located on the operator panel 212, the accessors 202, and so forth.

The illustrated library 700 also comprises a first accessor 704 and a second accessor 706. The first accessor 704 and second accessor 706 are substantially similar to the accessor 202 of FIG. 2 and its features. As shown, the first accessor 704 comprises a gripper assembly 708 as described above, a gripper drive 710, a rotation drive 712, an X rail drive 714, and a Y rail drive 716. Additionally, the first accessor 704 includes a bar code sensor 718 and a calibration sensor 720. The bar code sensor 718 also may be referred to as a reading system. The second accessor 706 is substantially similar to the first accessor 704; however, for clarity and ease of description, the components of the second accessor 706 are not shown.

The gripper drive 710 powers the cartridge grippers 602 of the gripper assembly 708. The rotation drive 712 causes the gripper assembly 708 to rotate, as described with reference to FIG. 2. The X rail drive 714 causes the vertical rail 220 and the gripper assembly 708 to move horizontally along the X rail 224. Similarly, the Y rail drive 716 causes the gripper assembly 708 to move vertically along the Y rail 220. The bar code sensor 718 is configured to "read" identifying information from, for example, a column 302 or a data storage cartridge 500. The calibration sensor 720 is configured to facilitate calibrating the first accessor 704, as described with reference to FIGS. 3 and 6. In certain embodiments, the bar code sensor 718 and the calibration sensor 720 are the same device.

In the event of a failure or other unavailability of the first accessor 704, or its gripper assembly 708, etc., the second accessor 706 may perform some or all of the functions otherwise performed by the first accessor 704. As mentioned above, the two accessors 704, 706 may share one or more mechanical paths or they may comprise completely independent mechanical paths. In one example, the accessors 704, 706 may have a common horizontal rail 224 with independent vertical rails 220. The first accessor 704 and the second accessor 706 are described as first and second for descriptive purposes only and this description is not meant to limit either accessor 704, 706 to an association with either a left hand service bay 104 or a right hand service bay 108.

In the exemplary library 700, the first accessor 704 and the second accessor 706 move their respective gripper assemblies 708 in at least two directions, called the horizontal "X" direction and vertical "Y" direction, as described above, to retrieve and grip, or to deliver and release a data storage cartridge 500 at the storage shelves 204 and to load and unload the data storage cartridges 500 at the data storage drives 210.

In one embodiment, the automated data storage library 700 receives operational commands from one or more host systems 722. The host systems 722, such as host servers, communicate with the library 700 directly, e.g., on a communications channel 724 or through one or more control ports (not shown). In another embodiment, the host systems 722 may communicate with the communication processor node 730 through one or more data storage drives 726 on one or more communication channels 728, 729. The data storage drives 726 are substantially similar to the data storage drives 210 described above.

The hosts 722 may be connected to the data storage drives 726 via a communication channel 729. In one embodiment, the communication channel 729 may be a small computer system interface (SCSI) bus. Alternately, the communication channel 729 may be a Fibre Channel bus, which is a high speed serial data interface that allows transmission over greater distances than the SCSI bus systems. In one embodiment, the data storage drives 726 may be in close proximity to the communication processor node 730 and the communication channel 728 may employ a short distance communication scheme, such as SCSI, or a serial connection, such as RS-422. The data storage drives 726 are also individually coupled to the communication processor node 730 by means of communication channels 728. Alternatively, the data storage drives 726 may be coupled to the communication processor node 730 through one or more networks, such as a common bus network. As is known to those of skill in the art, various communication arrangements may be employed for communication among the hosts 722, the data storage drives 726, and the communication processor node 730.

The host systems 722 are configured to provide operational commands to access a particular data storage cartridge 500 and move the cartridge 500, for example, between the storage shelves 204 and the data storage drives 726. The commands are typically logical commands identifying the cartridge 500 and/or logical locations for accessing the cartridge 500. The terms "commands" and "work requests" are used interchangeably herein to refer to such communications from the host system 722 to the library 700 that are intended to result in accessing a particular data storage cartridge 500 within the library 700.

In one embodiment, the exemplary library 700 is controlled by the distributed control system 702. The distributed control system 702 receives the logical commands from one or more hosts 722, determining the required actions, and converting the actions to physical movements of the first accessor 704 and/or second accessor 706. In the illustrated embodiment, the distributed control system 702 comprises a plurality of processor nodes, each having one or more processors. Specifically, the distributed control system 702 includes a communication processor node 730, an operator panel processor node 732, a work processor node 734, and a rail processor node 736. The distributed control system 702 may further include additional processor nodes 738, similar to the communication processor node 730, operator panel processor node 732, work processor node 734 and the rail processor node 736.

In one embodiment, the communication processor node 730 may be located in a storage frame 106. The communication processor node 730 provides a communication link for receiving the operational commands from a host 722, either directly or through the drives 726, or via at least one external interface, e.g., coupled to communication channel 724. The communication processor node 730 may additionally provide a communication link 728 for communicating with the data storage drives 726. In one embodiment, the communication processor node 730 may be located in a storage frame 106, for example, close to the data storage drives 726.

In a further embodiment of the distributed control system 702, one or more work processor nodes 734 are provided, which may be located at the first accessor 704. The work processor nodes 734 are coupled to the communication processor node 730 via a communications network 740. Each work processor node 734 may respond to received commands that are broadcast to the work processor nodes 734 from any communication processor node 730. Additionally, the work processor nodes 734 also may direct the operation of the accessors 704, 706, providing motion control or move commands, for example, to the gripper assembly 708, the gripper drive 710, the rotation drive 712, and the rail processor node 736.

The rail processor node 736 also may be coupled to the network 740. The rail processor node 736 is responsive to the move commands received from the work processor node 734, operating the X rail drive 714, and the Y rail drive 716 to position the gripper assembly 708. Together, the rail processor node 736, the X rail drive 714, and the Y rail drive 716 may be referred to as an "XY system" 741.

In the depicted embodiment, an operator panel processor node 732 is provided at the optional operator panel 742. The operator panel processor node 732 is configured to provide an interface for communicating between the operator panel 742 and the communication processor node(s) 730, the work processor node(s) 734, and the rail processor node(s) 736.

As described above, a communication network 740 is provided within the distributed control system 702, coupling the various processor nodes 730–738. In one embodiment, the communication network 740 may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other types of networks, such as Ethernet, or a wireless network system, such as RF or infrared, may be employed in the library 700 as is known to one of skill in the art. In addition, multiple independent connections and/or communication networks 740 may also be used to couple the various processor nodes 730–738.

An automated data storage library 700 typically comprises one or more controllers to direct the operation of the automated data storage library 700. Host computers 722 and data storage drives 726 typically comprise similar controllers. A controller may take many different forms and may comprise, for example but not limited to, an embedded system, a distributed control system, a personal computer, or a workstation. As used herein, the term "controller" is intended in its broadest sense as a device that contains at least one processor, as such term is defined herein.

Although not depicted herein, a typical controller includes a processor, an electronic memory device such as RAM (Random Access Memory), a nonvolatile memory device, device specific circuits, and I/O interface. Alternatively, the RAM and/or nonvolatile memory may be contained in the processor, as could the device specific circuits and the I/O interface. The processor may comprise, for example, an off-the-shelf microprocessor, custom processor, FPGA (Field Programmable Gate Array), ASIC (Application Specific Integrated Circuit), discrete logic, or the like.

The RAM (Random Access Memory) is typically used to hold variable data, stack data, executable instructions, and the like. The nonvolatile memory may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory is typically used to hold the executable firmware and any nonvolatile data. The I/O interface comprises a communication interface that allows the processor to communicate with devices external to the controller. Examples may comprise, but are not limited to, serial interfaces such as RS-232, USB (Universal Serial Bus), Ethernet, SCSI (Small Computer Systems Interface), and so forth.

The device specific circuits provide additional hardware to enable the controller to perform unique functions such as, but not limited to, motor control of a cartridge gripper assembly 708. The device specific circuits may comprise electronics that provide, by way of example but not limitation, Pulse Width Modulation (PWM) control, Analog to Digital Conversion (ADC), Digital to Analog Conversion (DAC), etc. In addition, all or part of the device specific circuits may reside outside the controller.

Figure 7A:
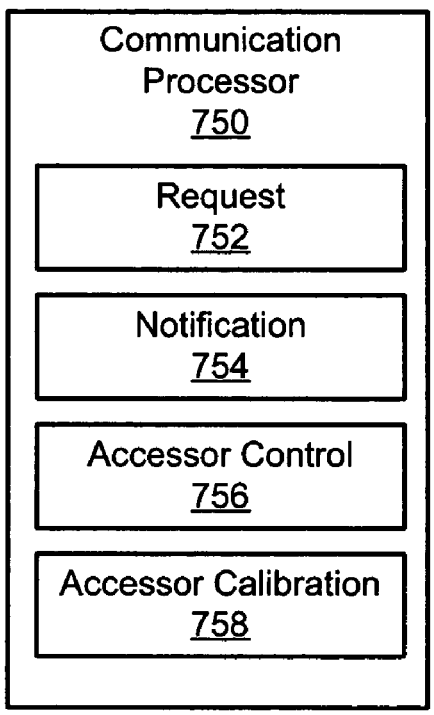
FIG. 7a is a schematic block diagram illustrating one embodiment of a communication processor in accordance with the present invention.

FIG. 7*a* depicts a more detailed embodiment of a communication processor 750 that is substantially similar to the communication processor 730 of FIG. 7. The illustrated communication processor 750 includes a request module 752, a notification module 754, an accessor control module 756, and an accessor calibration module 758. In one embodiment, the request module 752 receives a data access request from a host 722. As described above, the data access request may be a host command or request to move a data storage cartridge 500 to or from a data storage drive 726 for example.

The notification module 754 is configured, in one embodiment, to receive a notification from the accessor calibration module 758, for instance, that the calibration is complete. This status may be referred to as calibration completion, when an accessor 704, 706 is completely calibrated to the entire library 100. Alternately, the notification from the calibration module 758 may indicate that a sufficient segment of the calibration is complete, although not finalized, such that the communication processor 750 may receive data access requests from a host 722. In one embodiment, this status may be referred to as zoned calibration completion, in which an accessor 704, 706 is calibrated to a specified calibration zone, but not to the entire library 100.

Figure 7B:
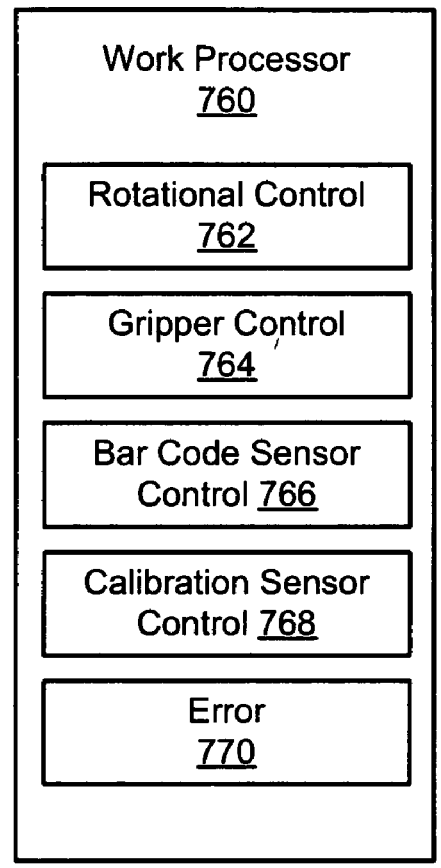
FIG. 7b is a schematic block diagram illustrating one embodiment of a work processor in accordance with the present invention.

The accessor control module 756 may generate, process, and communicate accessor control instructions to a work processor 760 (refer to FIG. 7b). The accessor control instructions may correspond, for example, to data access requests from a host 722. In one embodiment, the accessor control module 756 may convert a logical host command to corresponding physical motion control, or to move command(s) according to the physical implementation of the storage library 700. The accessor calibration module 758 also communicates certain instructions from the communication processor 750 to the work processor 760. The instructions generated, processed, and communicated to the work processor 760 by the accessor calibration module 758 pertain to calibration of the accessor 704 to its physical environment within the automated data storage library 700. One example of an accessor calibration module 758 is described in relation to FIG. 8.

FIG. 7b depicts a more detailed embodiment of a work processor 760 that is substantially similar to the work processor 734 of FIG. 7. The illustrated work processor 760 includes a rotational control module 762, a gripper control module 764, a bar code sensor control module 766, a calibration sensor control module 768, and an error module 770.

The rotational control module 762 is configured, in one embodiment, to control the rotational drive 712 of an accessor 704. Similarly, the gripper control module 764 controls the gripper assembly 708 and the gripper drive 710 within the accessor 704. Additionally, the bar code sensor control module 766 controls the operation of the bar code sensor 718. In one embodiment, each of these control modules 762, 764, 766 controls its respective device(s) according to control instructions received from the accessor control module 756 within the communication processor 750.

The calibration sensor control module 768 also controls the calibration sensor 720 according to one or more control instructions received from the accessor calibration module 758 of the communication processor 750. In particular, the calibration sensor control module 768 controls when the calibration sensor 720 transmits a calibration signal. The calibration sensor control module 768 also controls when the calibration sensor 720 attempts to detect a reflected calibration signal or otherwise detect the location and/or characteristics of a calibration reference point 304, 306, 610–616.

The error module 770 may detect an error within the accessor 704, 706, gripper assembly 708, gripper drive 710, rotation drive 712, X rail drive 714, Y rail drive 716, bar code sensor 718, and calibration sensor 720. The error module 770 also may detect an error that might occur during a calibration process. For instance, when multiple accessors 704, 706 within a data storage library 700 are each calibrating portions of the library 700, the error module 770 may detect or anticipate a collision or other interference between the accessors 704, 706 that might interfere with the performance of the accessors 704, 706.

Figure 7C:
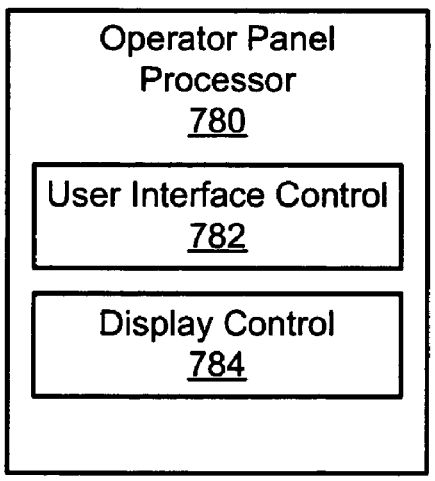
FIG. 7c is a schematic block diagram illustrating one embodiment of an operator panel processor in accordance with the present invention.

FIG. 7c depicts a more detailed embodiment of an operator panel processor 780 that is substantially similar to the operator panel processor 732 of FIG. 7. The illustrated operator panel processor 780 includes a user interface control module 782 and a display control module 784. The user interface control module 782 and display control module 784 are respectively configured to control the user input module 746 and display module 744 of the operator panel 742, as described with reference to FIG. 7.

Figure 7D:
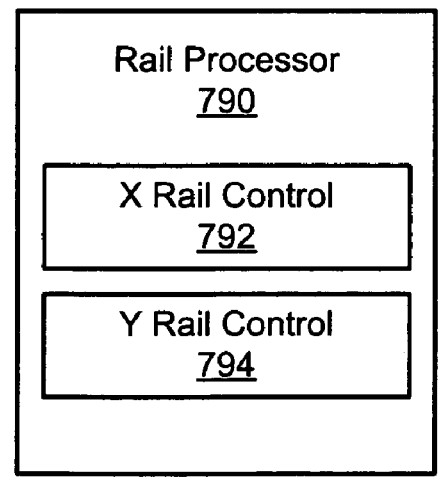
FIG. 7d is a schematic block diagram illustrating one embodiment of a rail processor in accordance with the present invention.

FIG. 7d depicts a more detailed embodiment of a rail processor 790 that is substantially similar to the rail processor 736 of FIG. 7. The illustrated rail processor 790 includes an X rail control module 792 and a Y rail control module 794. As described above, particularly with reference to FIGS. 2 and 7, these modules 792, 794 respectively control the movement of the accessor 704, 706 along the X rail 224 and Y rail 220. The X rail control module 792, in one embodiment, specifically controls the X rail drive 714. Similarly, the Y rail control module 794 specifically controls the Y rail drive 716.

Figure 8:
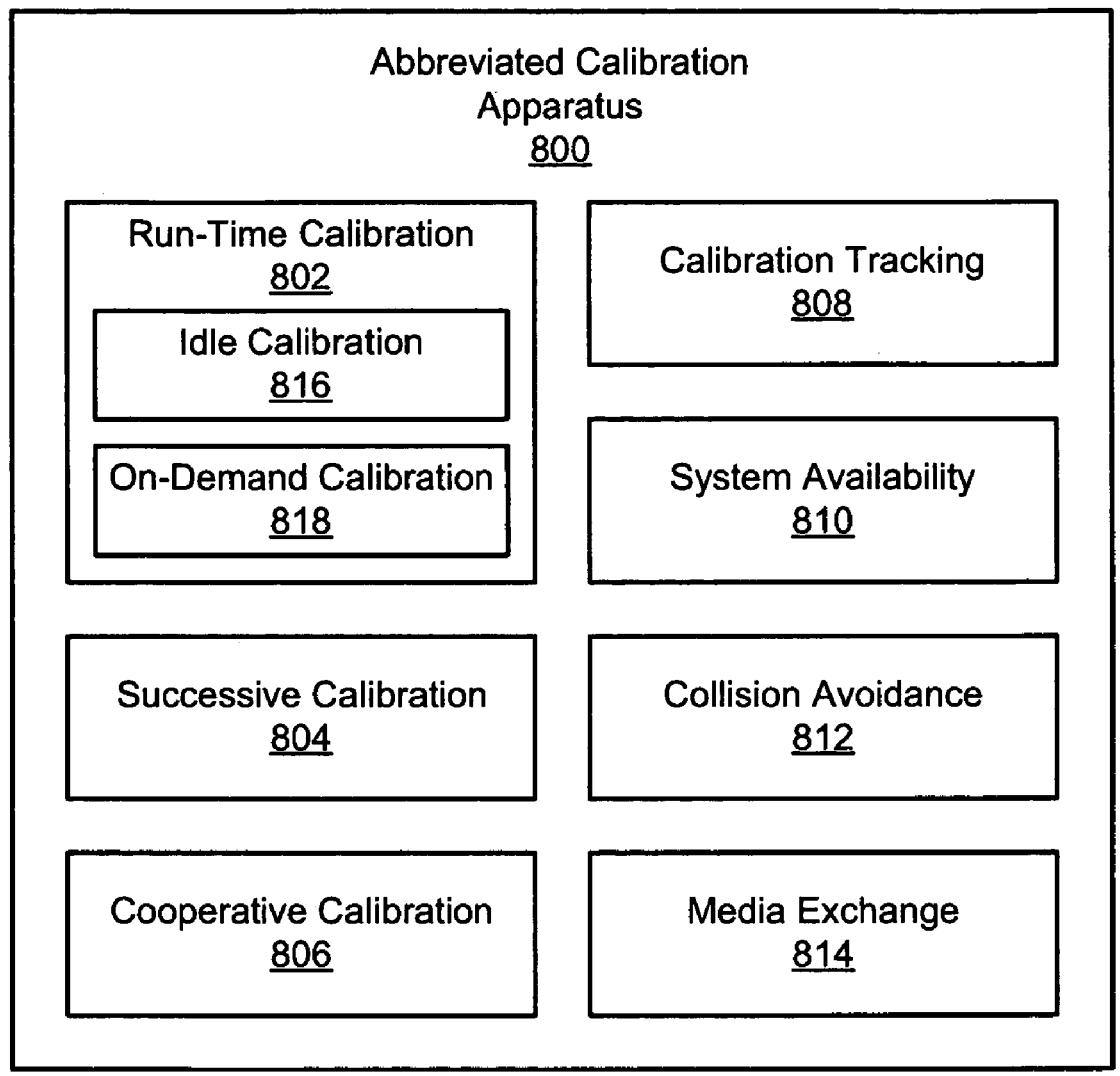
FIG. 8 is a block diagram depicting one embodiment of an abbreviated calibration apparatus in accordance with the present invention.

FIG. 8 depicts a detailed embodiment of an abbreviated calibration apparatus 800 that is substantially similar to the accessor calibration module 758 of FIG. 7a. The illustrated abbreviated calibration apparatus 800 includes a run-time calibration module 802, a successive calibration module 804, and a cooperative calibration module 806. Each of these calibration modules 802–806 is configured to implement a type of accessor calibration within the automated data storage library 700. The illustrated abbreviated calibration apparatus 800 also includes a calibration tracking module 808 a system availability module 810, a collision avoidance module 812, and a media exchange module 814.

In one embodiment, the run-time calibration module 802 calibrates a data storage library 700 having one or more accessors 704, 706. The run-time calibration module 802 is configured to calibrate the one or more accessors 704, 706 before and after the system availability module 810 notifies a host 722 that the data storage library 700 is available to process data access requests. In one embodiment, the system availability module 810 notifies the notification module 754 of the communication processor 750, which in turn notifies the host 722 that the library 700 is available.

By way of example, the run-time calibration module 802 may begin calibration of the one or more accessors 704, 706 while the library 700 is unavailable to the hosts 722. If the system availability module 810 notifies the host(s) 722 that the library 700 is available prior to completion of the calibration of any or all of the accessors 704, 706, the run-time calibration module 802 simply completes the remaining calibration while the library 700 is available. In one embodiment, the run-time calibration module 802 may employ an idle calibration module 816 to continue calibrating the accessors 704, 706 while the library 700 is otherwise idle, i.e. not processing a data access request from a host 722. In another embodiment, the run-time calibration module 802 may employ an idle calibration module 816 to continue calibrating the accessors 704, 706 while the library 700 is otherwise processing move commands, i.e. performing calibration steps in between the data access requests from hosts 722. As described above, processing a data access request may include physically retrieving a data storage cartridge 500 from a storage shelf 204 and inserting the cartridge 500 into a storage drive 210. Alternately, processing a data access request may include retrieving a data storage cartridge 500 from a drive 210 and returning the cartridge 500 to a storage shelf 204.

In a further embodiment, the run-time calibration module may employ an on-demand calibration module 818 to calibrate an accessor 704, 706 in response to and in order to fulfill a data access request from a host 722. One example of a method implementing the features of the run-time calibration module 802, idle calibration module 816, and on-demand calibration module 818 is provided with reference to FIG. 9.

The successive calibration module 804, in one embodiment, calibrates a data storage library 700 having two or more accessors 704, 706. The successive calibration module 804 is configured to calibrate the plurality of accessors 704, 706 in succession so that, for example, the second accessor 706 is calibrated directly following the calibration of the first accessor 704.

In one embodiment, the first accessor 704 may begin calibration and the second accessor 706, after a delay time period, begins calibration in succession to the first accessor 704. The delay stage may be a long period or a short period of time. In one embodiment, the delay stage may be approximately enough time to allow the first accessor 704 to complete calibration of one frame 106 of the library 700 before the second accessor 706 begins to calibrate the frame 106 just calibrated by the first accessor 704. Alternatively, the delay stage may be based, at least in part, on the amount of calibration that has been completed by the first accessor 704.

In this way, the total time to calibrate a data storage library 700 having two accessors 704, 706 is only slightly more than the time required to calibrate a similar library 700 having only a single accessor 704, 706. The difference in time is only the delay stage. In other words, the total calibration time equals the time to calibrate the first accessor 704 plus the delay time between the first and second accessors 704, 706. In a library 700 having more than two accessors 704, 706, the total calibration time equals the time to calibrate the first accessor 704 plus the sum of delay times between consecutive accessors 704, 706 (i.e. one and two, two and three, three and four, and so forth).

When the successive calibration module 804 performs a successive calibration of the accessors 704, 706 within a library 700, the system availability module 810 may notify a host 722 that the library 700 is available, for example, after only the first accessor 704 is calibrated. The abbreviated calibration apparatus 800 then may employ the run-time calibration module 802 to complete the calibration of the second accessor 706, for example, while the library 700 is available to process data access requests. One example of a method implementing the features of the successive calibration module 804 is provided with reference to FIG. 10.

The cooperative calibration module 806, in one embodiment, also calibrates a data storage library 700 having two or more accessors 704, 706. The cooperative calibration module 806 is configured to calibrate each of the plurality of accessors 704, 706 to a specific calibration zone. A calibration zone is defined by a division of the total library 700. For example, in a library having two accessors 704, 706, the library 700 may be divided into two calibration zones, each zone corresponding to one of the accessors 704, 706. The calibration zones may be wholly exclusive of one another or, alternately, may partially overlap.

In another embodiment, a library 700 may have fewer or more calibration zones than it has accessors 704, 706. For example, in one embodiment, a library 700 may have two accessors 704, 706 and three calibration zones. The first calibration zone may correspond to the first accessor 704. Similarly, the second calibration zone may correspond to the second accessor 706. The third calibration zone may be designated as an overlap zone such that both the first and second accessors 704, 706 may be calibrated to the third calibration zone. In one embodiment, each of the three exemplary calibration zones may be wholly exclusive of the other two zones. In another embodiment, the third calibration zone comprises some or all of the drives 726 of the library 700 such that either accessor 704, 706 may be used to move media 500 to/from the drives 726. One skilled in the art recognizes that various implementations of calibration zones may be realized within a data storage library 700 within the scope of the present invention.

By defining the calibration zones within a library 700, each of the accessors 704, 706 may be calibrated to certain calibration zones. In one embodiment in which a library 700 includes two calibration zones, the first accessor 704 may be calibrated to a first calibration zone and the second accessor 706 may be calibrated to the second calibration zone. Once the two accessors 704, 706 are respectively calibrated within their calibration zones, the system availability module 810 may notify a host 722 that the library 700 is available. The abbreviated calibration apparatus 800 then may employ the run-time calibration module 802 to complete the calibration of each of the two accessors 704, 706 in the formerly unassigned calibration zones. For instance, the first accessor 704 may be calibrated to the second calibration zone and the second accessor 706 may be calibrated to the first calibration zone. One example of a method implementing the features of the cooperative calibration module 806 is provided with reference to FIG. 11.

The calibration tracking module 808 of the abbreviated calibration apparatus 800 is configured to track the calibration progress of the one or more accessors 704, 706. The calibration tracking module 808 may track the calibration progress by recording which zones, storage shelves 204, storage drives 210, and so forth, are calibrated for a specific accessor 704, 706 at a given time. In one embodiment, the calibration tracking module 808 may store the calibration tracking data within the library 700 such that it may be referenced by another module or at another time.

As already referenced above, the system availability module 810 is configured to notify a host 722, either directly or through the communication processor 750, that the accessor is sufficiently calibrated so that the library 700 may be made available to the hosts 722. The collision avoidance module 812, in one embodiment, is configured to prevent accessors 704, 706 from colliding during the calibration process. The collision avoidance module 812 also may mitigate collisions of the accessors 704, 706 during data access operations.

The media exchange module 814 is configured to facilitate an exchange, or hand-off, of a data storage cartridge 500 between two or more accessors 704, 706. In one embodiment, a first accessor 704 may directly hand-off a cartridge 500 to a second accessor 706. Alternately, the first accessor 704 may indirectly hand-off a cartridge 500 to the second accessor 706 by placing the cartridge 500 in a location that is accessible to the second accessor 706. For example, the cartridge 500 may be placed in a cell of a storage shelf 204 or an I/O station 214, 216. In another embodiment, the cartridge 500 may be placed in a storage drive 210.

By allowing accessors 704, 706 to exchange a storage media cartridge 500 in this manner, the media exchange module 814 facilitates movement of the cartridge within areas of the library 700 that are not fully calibrated by all of the accessors 704, 706. For example, a first accessor 704 may be calibrated to retrieve a cartridge 500 from a storage shelf 204, but may not be calibrated to the destination storage drive 210. The first accessor 704 may retrieve the cartridge 500 and place the cartridge 500 in an overlap zone (calibrated by both the first accessor 704 and second accessor 706). The second accessor 706 then may retrieve the cartridge 500 from the overlap zone and complete the data access operation by inserting the cartridge 500 into the destination storage drive 210.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method.

Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Any actions that may be executed or performed in various steps of the flow chart diagrams, as described, may be executed or performed by a single library controller, multiple library controllers, or one or more controllers of a distributed control system 702.

Figure 9:
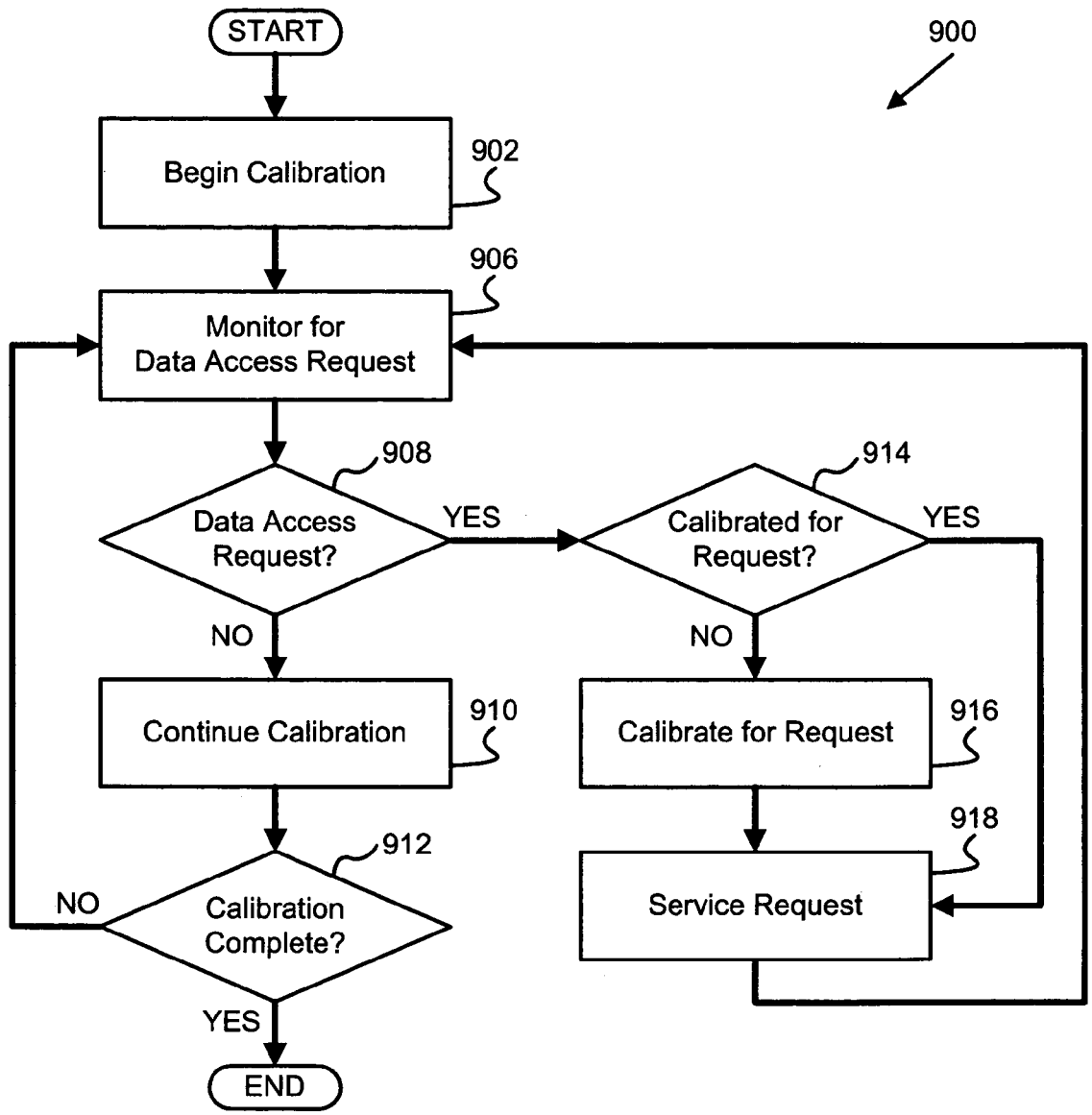
FIG. 9 is a schematic flow chart diagram illustrating one embodiment of a run-time calibration method in accordance with the present invention.

FIG. 9 depicts one embodiment of a run-time calibration method 900 that may be implemented in conjunction with the run-time calibration module 802 of the abbreviated calibration apparatus 800. As described above, the abbreviated calibration apparatus 800 may perform the run-time calibration method 900 in a library 700 having only a single accessor 704 or in a library 700 having a plurality of accessors 704, 706.

The illustrated run-time calibration method 900 begins with an uncalibrated library 700 or a partially calibrated library 700. In one embodiment, the library 700 is available to the host(s) 722, even though the library 700 is not fully calibrated. The run-time calibration module 802 begins calibrating 902 the accessor(s) 704 within the library 700. Alternately, the library 700 may initially be unavailable and later made available to the host(s) 722 after the run-time calibration module 802 begins calibrating the accessor(s) 704.

The request module 752 of the communication processor 750 monitors 906 for data access requests from the hosts 722. If the request module 752 determines 908 that no data access requests have been received, the run-time calibration module 802 may employ the idle calibration module 816 to continue calibrating 910 the accessor(s) 704. The calibration tracking module 808 continues tracking the calibration progress of the accessor(s) 704 to determine 912 if the calibration is complete. If the calibration is not complete, the request module 752 continues to monitor 906 for data access requests from the hosts 722 while the idle calibration module 816 continues to calibrate 910 the accessor(s) 704.

When the request module 752 determines 908 that a data access request has been received from a host 722, the calibration tracking module 808, in one embodiment, determines 914 if one or more accessor(s) 704 is calibrated to fulfill the data access request, either independently or jointly. If one or more accessor(s) 704 is not calibrated to fulfill the request, the run-time calibration module 802 employs the on-demand calibration module 818 to calibrate 916 the accessor(s) 704 for the request. If one of the accessor(s) 704 is already calibrated, or after the on-demand calibration module 818 calibrates 916 the accessor(s) 704, the accessor(s) 704 may service 918 the data access request by appropriately moving the data storage cartridges 500, and so forth. Subsequently, the request module 752 continues to monitor 906 for additional data access requests. After the tracking module 808 determines 912 that the library 700 is fully calibrated by the accessor(s) 704, the depicted run-time calibration method 900 ends.

Figure 10:
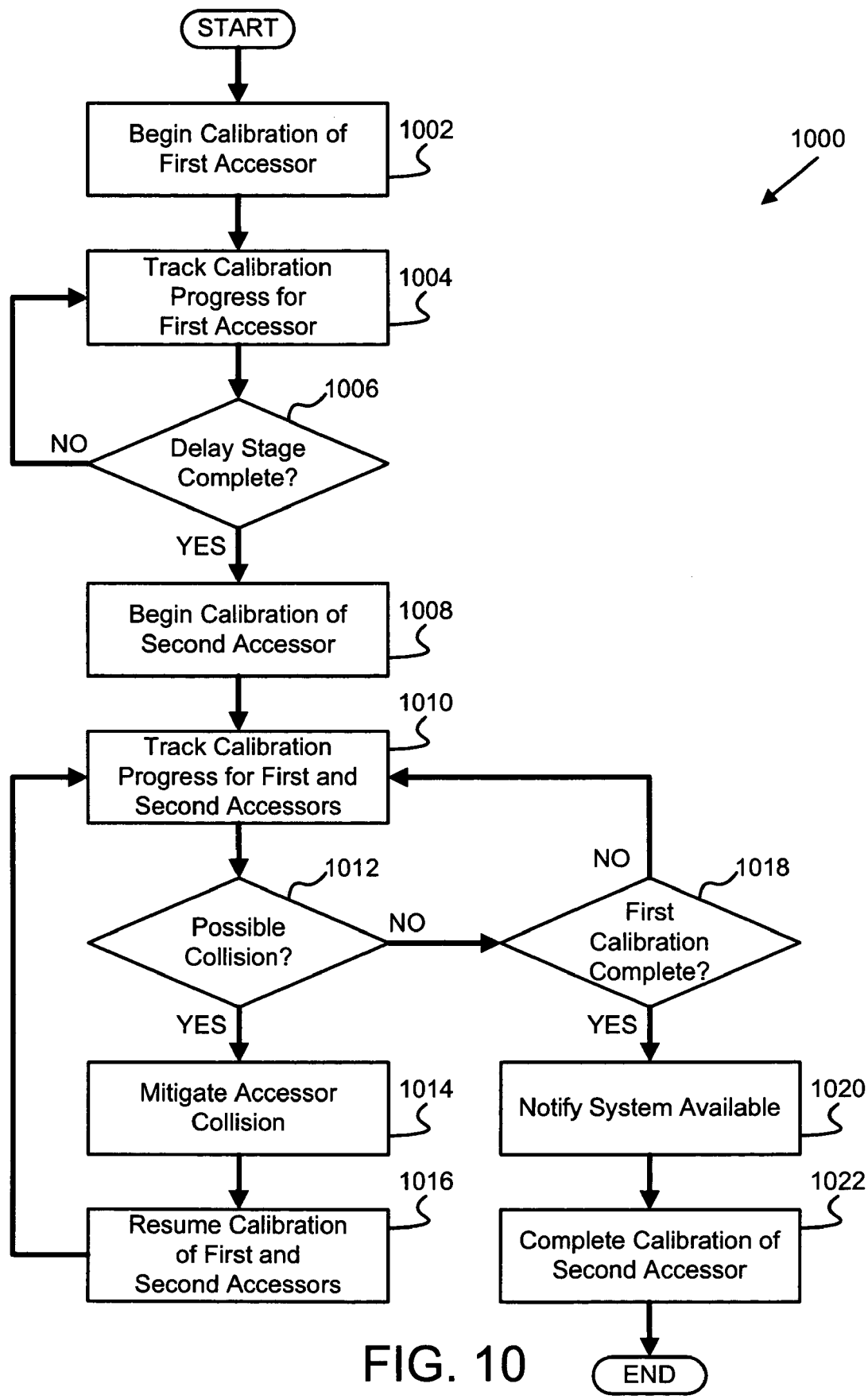
FIG. 10 is a schematic flow chart diagram illustrating one embodiment of a successive calibration method in accordance with the present invention.

FIG. 10 depicts one embodiment of a successive calibration method 1000 that may be implemented in conjunction with the successive calibration module 804 of the abbreviated calibration apparatus 800. As described above, the abbreviated calibration apparatus 800 may perform the successive calibration method 1000 in a library 700 having a plurality of accessors 704, 706. Although varying embodiments of the successive calibration method 1000 may accommodate more than two accessors 704, 706, the following description deals with only a first accessor 704 and a second accessor 706.

The illustrated successive calibration method 1000 begins with the data storage library 700 unavailable to the host(s) 722. With the library 700 unavailable, the successive calibration module 804 begins calibrating 1002 the first accessor 704. The calibration tracking module 808 correspondingly tracks 1004 the calibration progress of the first accessor 704. The calibration tracking module 808, in one embodiment, then determines 1006 if a predefined delay stage has completed. The delay stage may be defined by a time duration, for example two minutes, or alternately may be defined by a segment of the library 700, for example a first storage frame 106. Still further, the delay stage may be handled by the collision avoidance module 812. For example, the collision avoidance module 812 may prevent the second accessor 706 from starting its calibration until the first accessor 704 is sufficiently out of the way, to avoid a collision.

Once the calibration tracking module 808 determines 1006 that the delay stage is complete, the successive calibration module 804 begins calibrating 1008 the second accessor 706. In one embodiment, the second calibration module 706 follows an identical calibration path as the first accessor 704. Alternately, the second calibration module 706 may calibrate the storage shelves 204 and drives 210 in an alternate order from the first accessor 704.

While the successive calibration module 804 continues to calibrate both accessors 704, 706, the calibration tracking module 808 tracks 1010 the calibration progress of each of the accessors 704, 706. Using the tracking data, in one embodiment, the collision avoidance module 812 determines 1012 if a physical collision between the accessors 704, 706 is possible. If a collision is possible, the collision avoidance module 812 mitigates 1014 the potential collision. In one embodiment, the collision avoidance module 812 simply stops all movement of either the first accessor 704 or the second accessor 706. Alternately, the collision avoidance module 812 may issue control instruction to actively move one of the accessors 704, 706 out of the way of the other accessor 704, 706. After the collision avoidance module 812 mitigates 1014 the possible collision, the successive calibration module 804 may resume calibration of one or both of the accessors 1016.

On the other hand, if there is no potential for collision, the calibration tracking module 808 determines 1018 if the first accessor 704 is fully calibrated. Here it is assumed that the first accessor 704 is expected to complete calibration prior to the second accessor 706. In another embodiment, perhaps where the first accessor 704 begins calibration 1004 prior to the second accessor 706, but where the second accessor 706 is expected to complete calibration first due to a multiphased successive calibration, the calibration tracking module 808 may determine 1018 if the second accessor 704 is fully calibrated.

In the depicted embodiment, if the first accessor 704 is not fully calibrated, the successive calibration module continues to calibrate the accessors 704, 706 and the tracking module continues to track 1010 the calibration progress for both accessors 704, 706. Otherwise, if the calibration tracking module 808 determines 1018 that the first accessor 704 is fully calibrated, the system availability module 810 may notify 1020 one or more host(s) 722 that the library 700 is available. The abbreviated calibration apparatus 800 subsequently completes 1022 the calibration of the second accessor 706 while the library 700 is available. In one embodiment, the abbreviated calibration apparatus 800 may employ the run-time calibration module 802 to complete 1022 the calibration of the second accessor 706. The depicted successive calibration method 1000 then ends.

Figure 11:
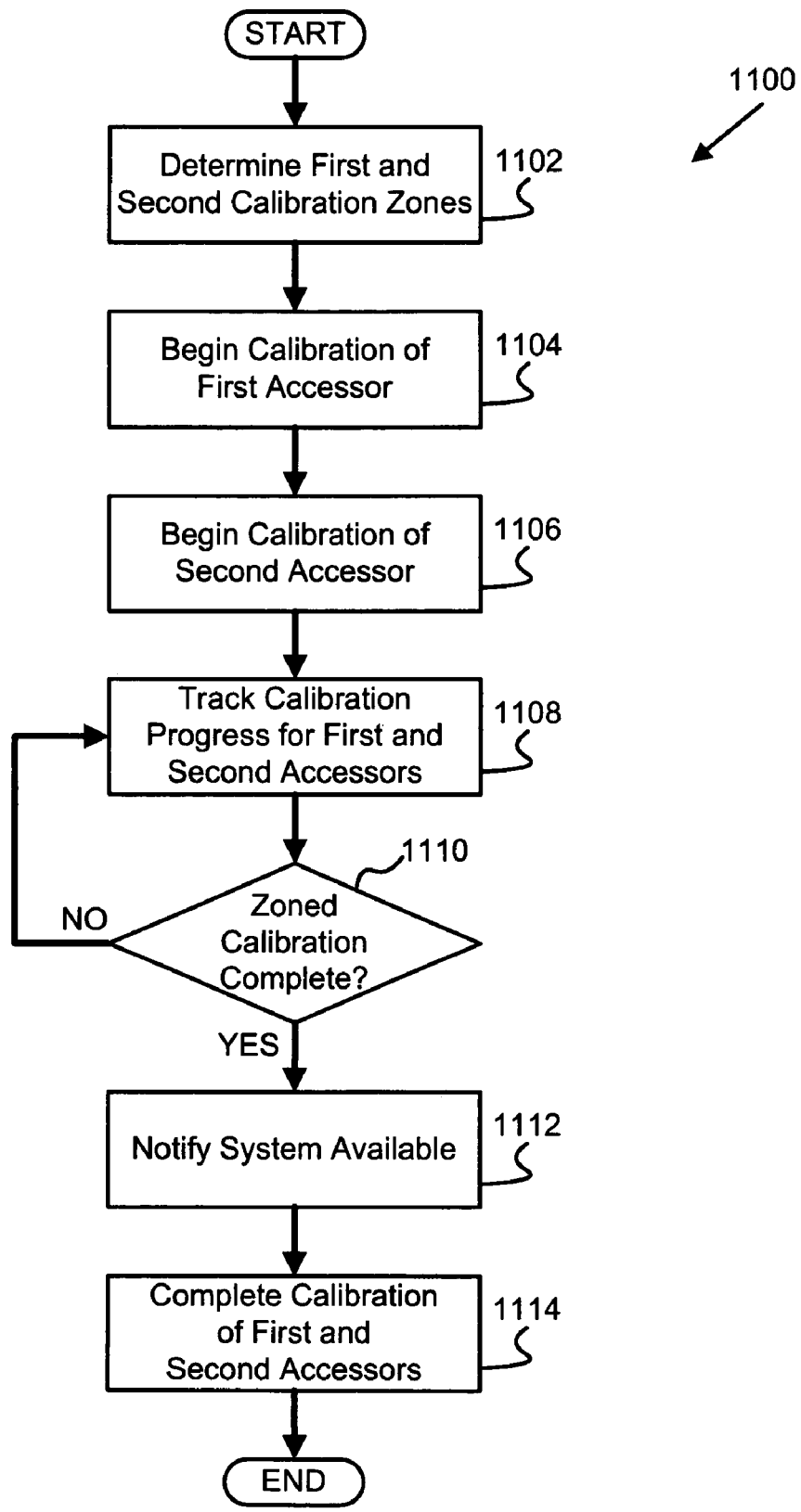
FIG. 11 is a schematic flow chart diagram illustrating one embodiment of a cooperative calibration method in accordance with the present invention.

FIG. 11 depicts one embodiment of a cooperative calibration method 1100 that may be implemented in conjunction with the cooperative calibration module 806 of the abbreviated calibration apparatus 800. As described above, the abbreviated calibration apparatus 800 may perform the cooperative calibration method 1100 in a library 700 having a plurality of accessors 704, 706. Although varying embodiments of the cooperative calibration method 1100 may accommodate more than two accessors 704, 706, the following description deals with only a first accessor 704 and a second accessor 706.

The illustrated cooperative calibration method 1100 begins with the data storage library 700 unavailable to the hosts 722. With the library 700 unavailable, the cooperative calibration module 806 designates first and second calibration zones 1102 within the library 700. In a further embodiment, the cooperative calibration module 806 may designate more than two calibration zones, as described above with reference to FIG. 8. After designating the calibration zones, the cooperative calibration module 806 begins calibrating 1104 the first accessor 704 in the first calibration zone and begins calibrating 1106 the second accessor 706 in the second calibration zone. The calibration of accessors 704, 706 may begin at the same time or at different times. In one embodiment, the first accessor 704 begins calibrating in an overlap zone and the second accessor 706 begins calibrating outside of an overlap zone.

While the accessors 704, 706 are calibrating within their designated zones, the calibration tracking module 808 tracks 1108 the calibration progress of each of the accessors 704, 706 and determines 1110 if both of the accessors 704, 706 are fully calibrated within their designated zones. If the accessors 704, 706 are not fully calibrated, the calibration tracking module 808 continues to track 1108 their respective calibration progress. When the calibration tracking module 808 determines 1110 that both of the accessors 704, 706 are fully calibrated within their corresponding calibration zones, the system availability module 810 may notify 1112 one or more hosts 722 that the library is available.

With both of the accessors 704, 706 fully calibrated within their respective calibration zones, the library 700 may service data access requests from the hosts 722. In certain embodiments, the abbreviated calibration apparatus 800 may employ the media exchange module 814 to hand-off data storage cartridges 500 where a single accessor 704, 706 is not calibrated to carry out a complete data access operation.

The abbreviated calibration apparatus 800 subsequently completes 1114 the calibration of the first accessor 704 in the second calibration zone and the calibration of the second accessor 706 in the first calibration zone while the library 700 is available to the hosts 722. In one embodiment, the abbreviated calibration apparatus 800 may employ the run-time calibration module 802 to complete 1114 the calibration of the accessors 704, 706 in their previously unassigned calibration zones. The depicted cooperative calibration method 1100 then ends.

Several references are made in the specification and figures to notifying the host(s) 722 that the library 700 is available or unavailable. This is not meant to limit the scope or method of communicating system availability to a host computer 722 or host application. Indeed, system availability may be communicated through a response to an attempted host command. For example, a host 722 may attempt to send a library command when the library 700 is unavailable and the library 700 may report an error to indicate that it cannot accept the command due to library unavailability. In another example, by accepting a host command, the library 700 may indirectly indicate that it is available. Therefore, references to notifying system availability and notifying hosts 722 refer to a change in the status of the library 700 that may result in direct or indirect, affirmative or responsive notification of system availability.

Additionally, several references are made in the specification and figures to data access requests from the host(s) 722. These data access requests refer to host commands that will, or are intended to, result in library 700 movement of data storage cartridges 500 to/from data storage drives 726 and/or library storage slots 204. In addition, various embodiments of the library 700 described herein are illustrated as a SCSI Medium Changer (SMC) device by way of example only. Other implementations of systems that automate the movement and access of removable data storage media 500 may equally employ one or more embodiments of the present invention. For example, but without limitation, certain embodiments of the present invention may be incorporated in Virtual Tape Servers (VTS), virtual media servers, or any other storage automation device.

In general and without specific reference to the figures, calibration of accessors within a library system, generally, supports many advantages. For example calibration allows for greater mechanical tolerances in the manufacture and production of the hardware that makes up the library. This, in turn, results in less expensive components and a more affordable product. Calibration also facilitates error recovery within a library system.

The various embodiments of the present invention described herein present further advantages over conventional library systems. In particular, certain embodiments of the present invention eliminate or reduce the amount of time that a library system must be unavailable to one or more hosts. By making the library system available to a host more quickly, less operational time is lost and consequently fewer costs are incurred. Additionally, certain embodiments allow a portion of the calibration to be completed, during idle time or on-demand, while the system is available to the hosts. In further embodiments, the present invention may be implemented in library systems having only one accessor or having a plurality of accessors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to perform an abbreviated calibration of a data storage library, the apparatus comprising:
   a calibration module configured to calibrate at least one accessor within a
   data storage library, the abbreviated calibration defining a physical relationship between the at least one accessor and a data storage location;
   at least one tracking module configured to track the calibration progress of each of the at least one accessors; and
   a system availability module configured to notify a host that the data storage library is available for a data access request prior to calibration completion, according to the at least one tracking module, of all of the at least one accessors.

2. The apparatus of claim 1, wherein the data storage library comprises a plurality of accessors and the calibration module comprises a cooperative calibration module, the cooperative calibration module configured to calibrate a first accessor in a first calibration zone and to calibrate a second accessor in a second calibration zone.

3. The apparatus of claim 2, wherein the system availability module is further configured to notify the host that the data storage library is available after the first accessor is calibrated to the first calibration zone and the second accessor is calibrated to the second calibration zone.

4. The apparatus of claim 1, wherein the data storage library comprises a first accessor and a second accessor and the calibration module comprises a successive calibration module, the successive calibration module configured to calibrate the first accessor and to concurrently calibrate the second accessor in succession to the first accessor, wherein the start of the calibration of the second accessor is delayed with reference to the start of the calibration of the first accessor.

5. The apparatus of claim 4, wherein the system availability module is further configured to notify the host that the data storage library is available after calibration completion of the first accessor and before calibration completion of the second accessor.

6. The apparatus of claim 1, wherein the system availability module is further configured to notify the host that the data storage library is available prior to calibration completion of any of the at least one accessors.

7. The apparatus of claim 1, wherein the calibration module comprises a run-time calibration module configured to complete calibration of any of the at least one accessors after notification that the data storage library is available.

8. The apparatus of claim 7, further comprising an idle calibration module configured to calibrate one of the at least one accessors during idle time when the data storage library is not processing a data access request.

9. The apparatus of claim 7, further comprising an on-demand calibration module configured to calibrate one of the at least one accessors in response to a data access request.

10. The apparatus of claim 1, further comprising a collision avoidance module configured to mitigate a potential collision of a plurality of the at least one accessors during the abbreviated calibration of any of the at least one accessors.

11. The apparatus of claim 1, farther comprising a media exchange module configured to facilitate an exchange of a data storage cartridge between two of the at least one accessors during calibration of any of the at least one accessors.

12. A system to perform an abbreviated calibration of a data storage library, the system comprising:
    a data storage library;
    a host configured to communicate a data access request to the data storage library;
    a first accessor and a second accessor within the data storage library, the first and second accessors configured to facilitate the data access request; and
    a calibration module configured to calibrate the first and second accessors, the abbreviated calibration defining a physical relationship between the first and second accessors and a plurality of data storage locations;
    at least one tracking module configured to track the calibration progress of the first and second accessors; and
    a system availability module configured to notify the host that the data storage library is available to process the data access request prior to calibration completion of either of the first and second accessors.

13. The system of claim 12, wherein the system availability module is further configured to notify the host that the data storage library is available prior to calibration completion of both of the first and second accessors.

14. The system of claim 12, further comprising a collision avoidance module configured to mitigate a potential collision between the first and second accessors during calibration of any of the first and second accessors.

15. The system of claim 12, further comprising a media exchange module configured to facilitate an exchange of a data storage device between the first and second accessors during calibration of any of the first and second accessors.

16. A system to perform an abbreviated calibration of a data storage library, the system comprising:
    a data storage library;
    a host configured to communicate a data access request to the data storage library;
    an accessor within the data storage library, the accessor configured to facilitate the data access request; and
    a calibration module configured to calibrate the accessor, the abbreviated calibration defining a physical relationship between the accessor and a plurality of data storage locations;
    a tracking module configured to track the calibration progress of the accessor; and
    a system availability module configured to notify the host that the data storage library is available to process the data access request prior to calibration completion of the accessor.

17. A computer readable storage medium comprising computer readable program code configured to execute on a processor for performing an abbreviated calibration of a data storage library, the program code configured to:
    calibrate at least one accessor within a data storage library, the abbreviated calibration defining a physical relationship between the at least one accessor and a data storage location;
    track the calibration progress of each of the at least one accessors; and
    notify a host that to data storage library is available for a data access request prior to calibration completion of all of the at least one accessors.

18. The computer readable storage medium of claim 17, wherein the program code is further configured to calibrate a first accessor in a first calibration zone and to calibrate a second accessor m a second calibration zone according to a cooperative calibration policy.

19. The computer readable storage medium of claim 18, wherein the program code is further configured to notify the host that the data storage library is available after the first accessor is calibrated to the first calibration zone and the second accessor is calibrated to the second calibration zone.

20. The computer readable storage medium of claim 17, wherein the program code is further configured to calibrate a first accessor and to concurrently calibrate a second accessor in succession to the first accessor, wherein the start of the calibration of the second accessor is delayed with reference to the start of the calibration of the first accessor, according to a successive calibration policy.

21. The computer readable storage medium of claim 20, wherein the program code is further configured to notify the host that the data storage library is available after calibration completion of the first accessor and before calibration completion of the second accessor.

22. The computer readable storage medium of claim 17, wherein the program code is further configured to notify the host that the data storage library is available prior to calibration completion of any of the at least one accessors.

23. The computer readable storage medium of claim 17, wherein the program code is further configured to complete calibration of any of the at least one accessors after notification that the data storage library is available, according to a run-time calibration policy.

24. The computer readable storage medium of claim 23, wherein the program code is further configured to calibrate one of the at least one accessors after notification daring idle time when the data storage library is not processing a data access request, according to an idle calibration policy.

25. The computer readable storage medium of claim 23, wherein the program code is further configured to calibrate one of the at least one accessors m response to a data access request for which the one of the at least one accessors is currently not calibrated, according to an on-demand calibration policy.

26. The computer readable storage medium of claim 17, wherein the program code is further configured to mitigate a potential collision of a plurality of the at least one accessors during calibration of any of the at least one accessors, according to a collision avoidance policy.

27. The computer readable storage medium of claim 17, wherein the program code is further configured to facilitate an exchange of a data storage cartridge between two of the at least one accessors during calibration of any of the at least one accessors, according to a media exchange policy.

28. A method for performing an abbreviated calibration of a data storage library, the method comprising:
   calibrating at least one accessor within the data storage library, the abbreviated calibration defining a physical relationship between the at least one accessor and a data storage location;
   tracking the calibration progress of each of the at least one accessors; and
   notifying a host that the data storage library is available for a data access request prior to calibration completion of all of the at least one accessors.

29. A method for performing an abbreviated calibration of a data storage library, the method comprising:
   calibrating a first accessor and a second accessor within a data storage library according to a cooperative calibration policy, the abbreviated calibration defining a physical relationship between the first and second accessors and a plurality of data storage locations;
   calibrating the first accessor in a first calibration zone defining a first group of the plurality of data storage locations;
   calibrating the second accessor in a second calibration zone defining a second group of the plurality of data storage locations, the second group at least partially exclusive of the first group;
   tracking the calibration progress of each of the first and second accessors;
   notifying a host that the data storage library is available after the first accessor is calibrated to the first calibration zone and the second accessor is calibrated to the second calibration zone; and
   completing calibration of at least one accessor after notification to the host that the data storage library is available, according to a run-time calibration policy.

30. An apparatus to perform an abbreviated calibration of a data storage library, the apparatus comprising:
   means for calibrating at least one accessor within a data storage library, the abbreviated calibration defining a physical relationship between the at least one accessor and a data storage location;
   means for tracking the calibration progress of each of the at least one accessors; and
   means for notifying a host that the data storage library is available for a data access request prior to calibration completion of all of the at least one accessors.

* * * * *

UNITED STATES PATENT AND TRADEMARK OFFICE
CERTIFICATE OF CORRECTION

PATENT NO. : 7,079,978 B2 Page 1 of 1
APPLICATION NO. : 10/852283
DATED : July 18, 2006
INVENTOR(S) : Brian Goodman It is certified that error appears in the above-identified patent and that said Letters Patent is hereby corrected as shown below:

Column 23
　　　Line 31, "notification daring" should read --notification during--

Signed and Sealed this

Twenty-first Day of November, 2006

JON W. DUDAS
*Director of the United States Patent and Trademark Office*